United States Patent
Lee (10) Patent No.: US 10,759,439 B2
(45) Date of Patent: Sep. 1, 2020

(54) DRIVER'S DRIVING TENDENCY DETERMINATION APPARATUS AND METHOD THEREOF

(71) Applicants: HYUNDAI MOTOR COMPANY, Seoul (KR); KIA MOTORS CORPORATION, Seoul (KR)

(72) Inventor: Sung-Yong Lee, Hwaseong-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 90 days.

(21) Appl. No.: 16/151,897

(22) Filed: Oct. 4, 2018

(65) Prior Publication Data

US 2019/0263418 A1    Aug. 29, 2019

(30) Foreign Application Priority Data

Feb. 27, 2018   (KR) .................... 10-2018-0023702

(51) Int. Cl.
| | |
|---|---|
| *B60W 40/09* | (2012.01) |
| *G01C 21/34* | (2006.01) |
| *G06K 9/00* | (2006.01) |
| *G06T 7/20* | (2017.01) |

(52) U.S. Cl.
CPC .............. *B60W 40/09* (2013.01); *G01C 21/34* (2013.01); *G06K 9/00791* (2013.01); *G06T 7/20* (2013.01); *B60W 2520/10* (2013.01); *B60W 2540/30* (2013.01); *G06T 2207/10016* (2013.01); *G06T 2207/30252* (2013.01)

(58) Field of Classification Search
CPC .............. G01C 21/3691; G01C 21/34; G06T 2207/10016; G06T 2207/30252; B60W 2520/10; B60W 2540/30; B60W 40/09; G06K 9/00791; G06K 9/00805
USPC ........................................................ 701/119
See application file for complete search history.

(56) References Cited

U.S. PATENT DOCUMENTS

| | | | |
|---|---|---|---|
| 9,189,897 B1* | 11/2015 | Stenneth ............... | B60W 40/06 |
| 9,443,426 B1* | 9/2016 | Formwalt .......... | G08G 1/09623 |
| 9,672,734 B1* | 6/2017 | Ratnasingam ....... | G08G 1/0145 |
| 9,701,307 B1* | 7/2017 | Newman ............... | B60W 10/04 |
| 2010/0256852 A1* | 10/2010 | Mudalige ................. | G08G 1/22 |
| | | | 701/24 |
| 2012/0109421 A1* | 5/2012 | Scarola .................. | G08G 1/163 |
| | | | 701/2 |
| 2013/0046456 A1* | 2/2013 | Scofield ............ | G01C 21/3453 |
| | | | 701/117 |

(Continued)

FOREIGN PATENT DOCUMENTS

KR     10-0715181 B1    5/2007

*Primary Examiner* — Atul Trivedi
(74) *Attorney, Agent, or Firm* — Morgan, Lewis & Bockius LLP (57) ABSTRACT

A driver's driving tendency determination apparatus includes: an image sensor for obtaining video information of nearby driving scenes; a speed sensor for obtaining speed information of the vehicle; a navigation system for obtaining traffic information of a road on which the vehicle travels; and a controller configured to calculate a number of overtaking vehicles and a number of overtaken vehicles by tracking movement directions of nearby vehicles through the video information, and determine driver's traffic flow following tendency by comparing the calculated numbers with a predetermined condition.

13 Claims, 6 Drawing Sheets

(56) References Cited

U.S. PATENT DOCUMENTS

| | | | |
|---|---|---|---|
| 2013/0282264 A1* | 10/2013 | Bastiaensen | G08G 1/0129 701/119 |
| 2014/0278052 A1* | 9/2014 | Slavin | G08G 1/0145 701/400 |
| 2014/0350777 A1* | 11/2014 | Kawai | G07C 5/0808 701/32.3 |
| 2015/0112730 A1* | 4/2015 | Binion | G06Q 40/08 705/4 |
| 2016/0097648 A1* | 4/2016 | Hannah | G08G 1/096716 701/118 |
| 2016/0180707 A1* | 6/2016 | MacNeille | G08G 1/096775 701/117 |
| 2016/0363935 A1* | 12/2016 | Shuster | G08G 1/0175 |
| 2017/0053534 A1* | 2/2017 | Lokesh | H04L 67/12 |
| 2017/0309092 A1* | 10/2017 | Rosenbaum | G01M 17/007 |
| 2018/0003516 A1* | 1/2018 | Khasis | G08G 1/20 |
| 2018/0082134 A1* | 3/2018 | Sivaraman | B60Q 1/503 |
| 2018/0129204 A1* | 5/2018 | Ricci | B60W 40/09 |
| 2018/0211529 A1* | 7/2018 | Kaur | G08G 1/0967 |
| 2019/0278297 A1* | 9/2019 | Averhart | G05D 1/0278 |
| 2019/0333371 A1* | 10/2019 | Julian | G06K 9/00845 |
| 2019/0369637 A1* | 12/2019 | Shalev-Shwartz | G06K 9/00791 |
| 2020/0111350 A1* | 4/2020 | Julian | G06K 9/00791 |

\* cited by examiner

※ TRAFFIC SITUATION-SMOOTHNESS (REFERENCE SPEED RANGE: DRIVING SPEED ≥70km/h)

| VEHICLE SPEED SECTION | OVERTAKING CONDITION (THRESHOLD VALUE p=10) | TRAFFIC FLOW FOLLOWING TENDENCY | SPEED TENDENCY | REMARKS |
|---|---|---|---|---|
| SPEED INFORMATION ≥90km/h | NONE | PRECEDING | FAST | |
| SPEED INFORMATION ≥70km/h | OVERTAKEN VEHICLES-OVERTAKING VEHICLES>p | PRECEDING | NORMAL | |
| | \|OVERTAKEN VEHICLES-OVERTAKING VEHICLES\|≤p | FOLLOWING | NORMAL | |
| | OVERTAKING VEHICLES-OVERTAKEN VEHICLES>p | TRAILING | NORMAL | |
| SPEED <70km/h | OVERTAKEN VEHICLES-OVERTAKING VEHICLES>p | PRECEDING | | TRAFFIC INFORMATION ERROR |
| | \|OVERTAKEN VEHICLES-OVERTAKING VEHICLES\|≤p | FOLLOWING | | TRAFFIC INFORMATION ERROR |
| | OVERTAKING VEHICLES-OVERTAKEN VEHICLES>p | TRAILING | SLOW | |

FIG. 3A

※ TRAFFIC SITUATION-SMOOTHNESS DELAY (REFERENCE SPEED RANGE: DRIVING SPEED ≥40km/h)

| VEHICLE SPEED SECTION | OVERTAKING CONDITION (THRESHOLD VALUE q=20) | TRAFFIC FLOW FOLLOWING TENDENCY | SPEED TENDENCY | REMARKS |
|---|---|---|---|---|
| SPEED INFORMATION ≥70km/h | OVERTAKING VEHICLES-OVERTAKEN VEHICLES>q | PRECEDING | FAST | |
| | \|OVERTAKING VEHICLES-OVERTAKEN VEHICLES\|≤q | FOLLOWING | | TRAFFIC INFORMATION ERROR |
| | OVERTAKING VEHICLES-OVERTAKEN VEHICLES>q | TRAILING | | TRAFFIC INFORMATION ERROR |
| SPEED INFORMATION ≥40km/h | OVERTAKEN VEHICLES-OVERTAKING VEHICLES>q | PRECEDING | NORMAL | |
| | \|OVERTAKING VEHICLES-OVERTAKEN VEHICLES\|≤q | FOLLOWING | NORMAL | |
| | OVERTAKING VEHICLES-OVERTAKEN VEHICLES>q | TRAILING | NORMAL | |
| SPEED<40km/h | OVERTAKEN VEHICLES-OVERTAKING VEHICLES>q | PRECEDING | | TRAFFIC INFORMATION ERROR |
| | \|OVERTAKING VEHICLES-OVERTAKEN VEHICLES\|≤q | FOLLOWING | | TRAFFIC INFORMATION ERROR |
| | OVERTAKING VEHICLES-OVERTAKEN VEHICLES>q | TRAILING | SLOW | |

FIG. 3B

※ TRAFFIC SITUATION - JAM (REFERENCE SPEED RANGE: DRIVING SPEED <40km/h)

| VEHICLE SPEED SECTION | OVERTAKING CONDITION (THRESHOLD VALUE r=30) | TRAFFIC FLOW FOLLOWING TENDENCY | SPEED TENDENCY | REMARKS |
|---|---|---|---|---|
| SPEED INFORMATION ≥40km/h | OVERTAKEN VEHICLES - OVERTAKING VEHICLES > r | PRECEDING | FAST | |
| | \|OVERTAKEN VEHICLES - OVERTAKING VEHICLES\| ≤ r | FOLLOWING | | TRAFFIC INFORMATION ERROR |
| | OVERTAKING VEHICLES - OVERTAKEN VEHICLES > r | TRAILING | | TRAFFIC INFORMATION ERROR |
| SPEED INFORMATION <40km/h | OVERTAKEN VEHICLES - OVERTAKING VEHICLES > r | PRECEDING | NORMAL | |
| | \|OVERTAKEN VEHICLES - OVERTAKING VEHICLES\| ≤ r | FOLLOWING | NORMAL | |
| | OVERTAKING VEHICLES - OVERTAKEN VEHICLES > r | TRAILING | SLOW | |

DRIVER'S DRIVING TENDENCY DETERMINATION APPARATUS AND METHOD THEREOF

CROSS-REFERENCE(S) TO RELATED APPLICATIONS

This application claims priority to Korean Patent Application No. 10-2018-0023702, filed on Feb. 27, 2018 which is incorporated herein by reference in its entirety.

TECHNICAL FIELD

The present disclosure relates to a driver's driving tendency determination apparatus and a method thereof, and more particularly, to a driver's driving tendency determination apparatus and a method thereof for analyzing driver's driving tendency considering a relative speed level with nearby vehicles depending upon traffic flow by determining the driver's driving tendency using speed information of a vehicle and an overtaking condition with the nearby vehicles depending upon each traffic situation.

BACKGROUND

Driver's driving tendency can depend upon characteristics and performance of a vehicle, but since it is an important factor affecting durability, economy, safety, etc. of the vehicle, it should be analyzed to provide various additional services to the driver.

For example, the driver's driving tendency can cause a lot of differences in fuel efficiency, the parts replacement timing of the vehicle, etc. That is, if a driver has the driving tendency of rapid acceleration and rapid braking, fuel consumption is increased, also the tires are badly worn, and other parts such as a brake related thereto are inevitably overloaded.

In addition, the driver's driving tendency can affect the arrival estimated time of navigation. That is, depending upon the driver, some drivers safely drive while others drive over the normal speed limit. In this case, the arrival estimated time to the final destination can be slower or faster depending upon each driver, such that accuracy thereof can be reduced.

Conventionally, the driver's driving tendency is determined using only the driving speed of the vehicle in most cases. That is, since the driver's driving tendency is conventionally determined using only a vehicle speed without the relative comparison with nearby vehicles, it cannot be confirmed if the vehicle is quickly driving while overtaking nearby vehicles or is driving corresponding to the flows of the nearby vehicles.

Accordingly, it is necessary to determine the driver's driving tendency by distinguishing between what characteristics the driver is driving depending upon traffic flow and what the relative speed level with nearby vehicles is.

The contents described in Description of Related Art are to help the understanding of the background of the present disclosure, and may include what is not previously known to those skilled in the art to which the present disclosure pertains.

SUMMARY OF THE DISCLOSURE

The object of the present disclosure is to provide a driver's driving tendency determination apparatus and a method thereof for analyzing driver's driving tendency considering a relative speed level with nearby vehicles depending upon traffic flow by determining the driver's driving tendency using speed information of a vehicle and an overtaking condition with nearby vehicles depending upon each traffic situation.

A driver's driving tendency determination apparatus in accordance with an embodiment of the present disclosure may include: an image sensor for obtaining video information of nearby driving scenes; a speed sensor for obtaining speed information of the vehicle; a navigation system for obtaining traffic information of a road on which the vehicle travels; and a controller configured to: calculate a number of overtaking vehicles and a number of overtaken vehicles by tracking movement directions of nearby vehicles through the video information; and determine driver's traffic flow following tendency by comparing the calculated numbers with a predetermined condition.

The controller may determine the driver's speed tendency using the traffic information indicating speed information of the vehicle and traffic situation of the road on which the vehicle is driving.

The controller may prepare determination reference with respect to the driver's traffic flow following tendency and speed tendency by integrating the predetermined condition per vehicle speed section depending upon each traffic situation.

The controller may sense a traffic information error based on the determined results with respect to the driver's traffic flow following tendency depending upon the predetermined condition.

The predetermined condition may compare a difference value of the calculated number of each of the overtaking vehicles and overtaken vehicles with a threshold value.

The threshold value may be variously set depending upon traffic situation.

The driver's traffic flow following tendency may be determined as preceding when the calculated overtaken vehicles are greater than the overtaking vehicles by the threshold value or more, determined as trailing when the calculated overtaking vehicles are greater than the overtaken vehicles by the threshold value or more, and determined as following when the different value of the calculated overtaken vehicles and overtaking vehicles is smaller than the threshold value.

The controller may sense traffic information error when the driver's traffic flow following tendency is following or trailing in the case that the vehicle speed is greater than a reference speed range of traffic situation.

The controller may sense the traffic information error when the driver's traffic flow following tendency is preceding or following in the case that the vehicle speed is smaller than a reference speed range of traffic situation.

In addition, a method of determining driver's driving tendency in accordance with an embodiment of the present disclosure may include: calculating, by a controller, a number of overtaking vehicles and a number of overtaken vehicles by tracking movement directions of nearby vehicles through video information of nearby driving scenes; and determining, by the controller, driver's traffic flow following tendency by comparing the calculated numbers with a predetermined condition.

The determining can include determining the driver's speed tendency using the traffic information indicating speed information of the vehicle and traffic situation of the road on which the vehicle is driving.

The determining can prepare determination reference with respect to the driver's traffic flow following tendency and speed tendency by integrating the predetermined condition per vehicle speed section depending upon each traffic situation.

According to an embodiment, after the determining, the method of determining the driver's driving tendency can further include sensing a traffic information error based on the determined results with respect to the driver's traffic flow following tendency depending upon the predetermined condition.

The present disclosure can analyze the driver's driving tendency considering a relative speed level with nearby vehicles depending upon the traffic situation by determining the driver's driving tendency using the speed information of the vehicle and the overtaking condition with the nearby vehicles for each traffic situation.

In addition, the present disclosure can determine the driver's traffic flow following tendency and speed tendency using the video information as well as the traffic information and the vehicle speed.

In addition, the present disclosure can determine if the vehicle precedes, follows, or trails the traffic flow depending upon the traffic situation.

In addition, the present disclosure can determine if the vehicle is driving relatively fast, normally, or slowly in the traffic situation.

In addition, the present disclosure can be applied to the navigation calculating the arrival estimated time corresponding to the driver's driving tendency, or to a safety system that a warning level is changed depending upon the driver's driving tendency.

DESCRIPTION OF SPECIFIC EMBODIMENTS

Hereinafter, exemplary embodiments of the present disclosure will be described in detail with reference to the accompanying drawings. However, in the following description and the accompanying drawings, a detailed description of well-known functions or configurations that can obscure the subject of the present disclosure will be omitted. In addition, it should be noted that the same components are denoted by the same reference numerals as much as possible throughout the entire drawings.

It should be understood that the terms or the words used in the specification and claims hereinafter described should not be construed as limited to general or dictionary meanings, but interpreted based on the meanings and concepts corresponding to technical aspects of the present disclosure on the basis of the principle that the inventor is allowed to define terms appropriately for the best explanation.

Accordingly, the embodiments described in the present specification and the configurations illustrated in the drawings are merely the most preferred one embodiment of the present disclosure, and not intended to represent all of the technical spirits of the present disclosure. Therefore, it should be understood that various equivalents and modifications can be substituted for those at the time of filing the present application.

Some elements are exaggerated, omitted, or schematically illustrated in the accompanying drawings, and actual sizes of respective elements are not necessarily represented in the drawings. The present disclosure is not limited by relative sizes or distances illustrated in the accompanying drawings.

In the entire specification, when a certain portion "includes" a certain component, this means that the other components are excluded, but can be further included unless specially described otherwise. In addition, when a certain portion is "connected" to another portion, it can be "directly connected" or "electrically connected" with other elements interposed therebetween.

The singular forms include the plural forms unless the context clearly indicates otherwise. It will be understood that the terms "comprises" or "includes" specify the presence of features, integers, steps, operations, elements, components, or a combination thereof described in this specification, but do not preclude the presence or addition of one or more other features, integers, steps, operations, elements, components, or a combination thereof.

In addition, the term "~unit," as used in the specification means a software or hardware component, such as FPGA or ASIC, which performs certain tasks. However, "~unit" does not mean to be limited to software or hardware. The term "~unit" may be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units."

Hereinafter, exemplary embodiments of the present disclosure will be described in detail with reference to the accompanying drawings so that those skilled in the art may easily practice the present disclosure. However, the present disclosure may be implemented in various different forms, and is not limited to the exemplary embodiments described herein. And, in the drawings, in order to clearly describe the present disclosure, portions which are not related to the description of the present disclosure are omitted, and similar portions are denoted by similar reference numerals in the entire specification.

Hereinafter, the preferred embodiments of the present disclosure will be described with reference to the accompanying drawings.

Figure 1:
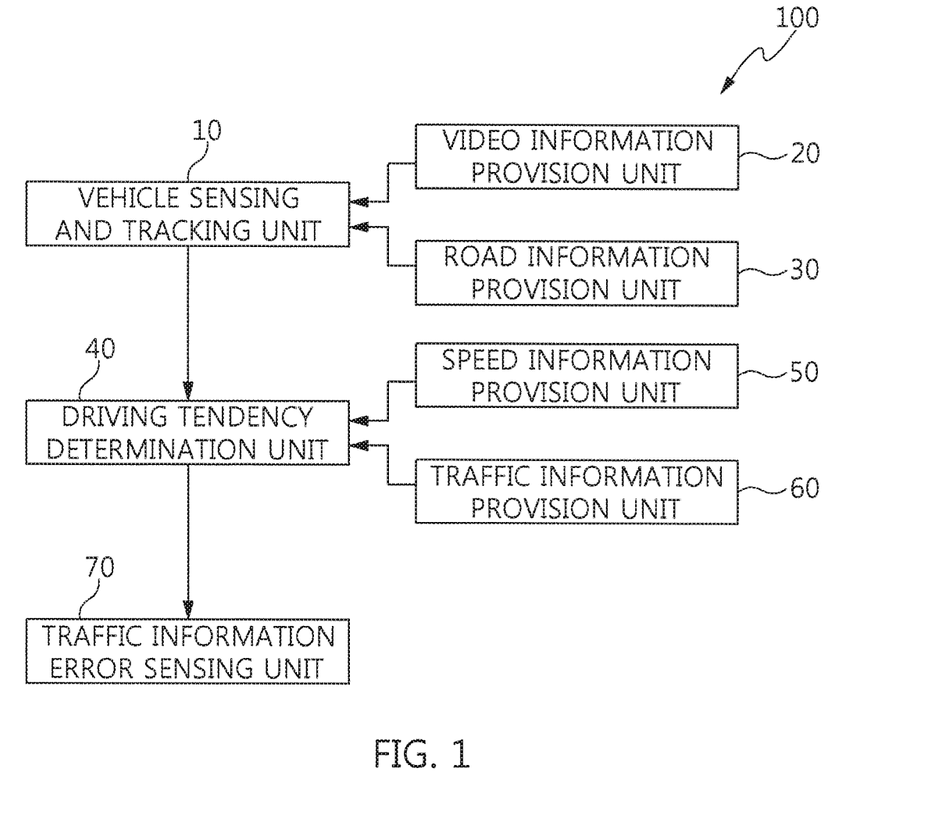
FIG. 1 is a diagram illustrating a driver's driving tendency determination apparatus in accordance with an embodiment of the present disclosure.

FIG. 1 is a diagram illustrating a driver's driving tendency determination apparatus in accordance with an embodiment of the present disclosure.

As illustrated in FIG. 1, a driver's driving tendency determination apparatus (hereinafter, referred to as 'a driving tendency determination apparatus') 100 in accordance with an embodiment of the present disclosure can analyze driver's driving tendency considering a relative speed level with nearby vehicles depending upon traffic flow by determining the driver's driving tendency using speed information of a vehicle and an overtaking condition with the nearby vehicles depending upon each traffic situation.

The driving tendency determination apparatus 100 includes a vehicle sensing and tracking unit 10, a video information provision unit 20, a road information provision unit 30, a driving tendency determination unit 40, a speed information provision unit 50, a traffic information provision unit 60, and a traffic information error sensing unit 70.

When the vehicle is driving, the vehicle sensing and tracking unit 10 senses nearby vehicles in real time from video information provided from the video information provision unit 20 to track the movement directions of the nearby vehicles.

Firstly, the vehicle sensing and tracking unit 10 senses the nearby vehicles for each lane based on the vehicle in the video information. That is, the vehicle sensing and tracking unit 10 senses the nearby vehicles in the same lane as the vehicle, the nearby vehicles in the left lane thereof, and the nearby vehicles in the right lane thereof.

In addition, the vehicle sensing and tracking unit 10 can distinguish the lane from the video information if there is a curved-road ahead, but can also confirm what lane the vehicle is located by finding the two-dimensional boundary of the lane using the road information provided from the road information provision unit 30.

Next, the vehicle sensing and tracking unit 10 tracks the movement directions of the sensed nearby vehicles. That is, the vehicle sensing and tracking unit 10 can confirm if the nearby vehicles are overtaken by the vehicle to move backward or overtake the vehicle to move forward by tracking the movement directions of the sensed nearby vehicles in the left lane or the right lane of the vehicle.

Herein, for convenience of explanation, the nearby vehicles can be defined as follows.

Firstly, as the nearby vehicle overtaking the vehicle, the case that corresponds to the vehicle appearing from behind and moving forward based on the screen of the video information is hereinafter referred to as 'overtaking vehicle.' Next, as the nearby vehicle that the vehicle overtakes and then overtaken by the vehicle, the case that corresponds to the vehicle moving from front to back and disappearing from the view based on the screen of the video information is hereinafter referred to as 'overtaken vehicle.'

Figure 2:
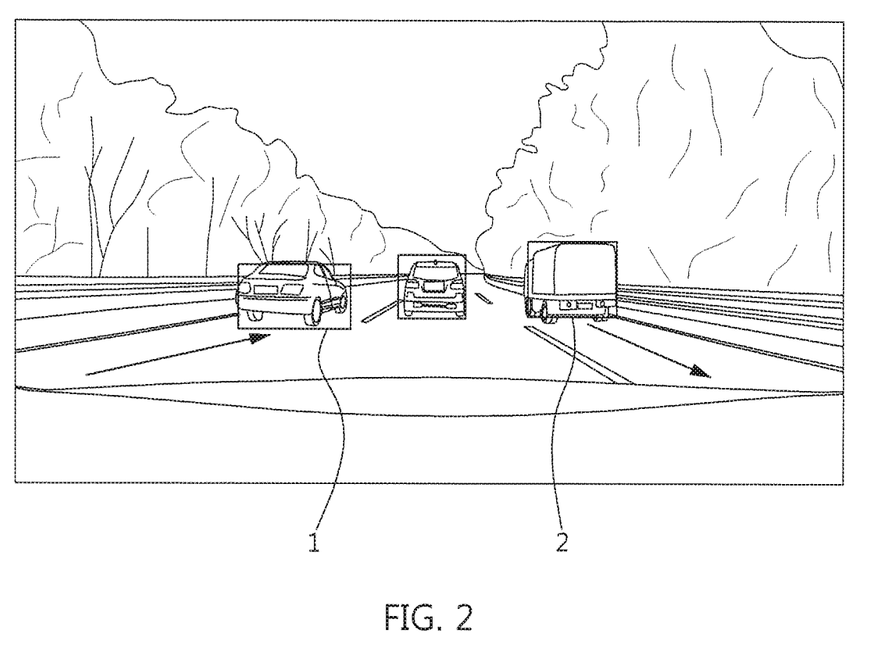
FIG. 2 is a diagram explaining a movement direction tracking situation of nearby vehicles.

Referring to FIG. 2, when the vehicle is driving in the second lane, a nearby vehicle 1 in the left lane based on the vehicle corresponds to 'an overtaking vehicle,' and a nearby vehicle 2 in the right lane based on the vehicle corresponds to 'an overtaken vehicle.' FIG. 2 is a diagram explaining a movement direction tracking situation of the nearby vehicles.

Thus, the vehicle sensing and tracking unit 10 can calculate the number of each of the overtaking vehicles and overtaken vehicles.

As described above, the video information provision unit 20 provides the video information, in which the front driving scenes of the vehicle are shot, to the vehicle sensing and tracking unit 10. In this time, the video information provision unit 20 can provide the video information that is shot through a camera, a blackbox, etc. facing the front of the vehicle thereto.

In addition, the road information provision unit 30 provides the road information that the vehicle is driving, such as a type of the road, a road speed limit, and the number of the road lanes, to the vehicle sensing and tracking unit 10. In this time, the road information provision unit 30 can provide the road information by obtaining the road information from the map information confirmed through navigation, etc.

The driving tendency determination unit 40 determines driver's traffic flow following tendency using the number of each of the overtaking vehicles and the overtaken vehicles calculated by the vehicle sensing and tracking unit 10.

Specifically, the driving tendency determination unit 40 determines the driver's traffic flow following tendency depending upon the overtaking condition that compares 'the difference value of the number of overtaking vehicles and overtaken vehicles' with 'a predetermined threshold value.' A Table 1 below indicates the determined results with respect to the driver's traffic flow following tendency depending upon the overtaking condition.

In various embodiments of the present disclosure, the vehicle sensing and tracking unit 10, the video information provision unit 20, the road information provision unit 30, the driving tendency determination unit 40, the speed information provision unit 50, the traffic information provision unit 60, and the traffic information error sensing unit 70 may be hardware devices and may be connected to a controller such as electronic control unit (ECU) of a vehicle or embedded therein. In addition, the video information provision unit 20 and the road information provision unit 30 may include an image sensor, such as a camera, Radar, etc., for taking images or videos of the surroundings. The speed information provision unit 30 may include a speed sensor for sensing a vehicle speed, and the traffic information provision unit 60 may include a global positioning system (GPS).

Additionally, "~unit" may include components, such as software components, object-oriented software components, class components and task components, processes, functions, attributes, procedures, subroutines, segments of program code, drivers, firmware, microcode, circuitry, data, databases, data structures, tables, arrays, and variables. In this regard, the various embodiments disclosed herein, including embodiments of the driving tendency determination apparatus 100 and/or elements thereof, can be implemented using one or more processors coupled to a memory (or other non-transitory machine readable recording medium) storing computer-executable instructions for causing the processor(s) to perform the functions described above including the functions described in relation to the vehicle sensing and tracking unit 10, the video information provision unit 20, the road information provision unit 30, the driving tendency determination unit 40, the speed information provision unit 50, the traffic information provision unit 60, and the traffic information error sensing unit 70.

Herein, the number of overtaking vehicles and overtaken vehicles is used with the results measured for a predetermined time (e.g., five minutes) before determining the driving tendency. The threshold value is variously set depending upon traffic information. For example, if the traffic situation of the road is 'smoothness,' it is '10,' if the traffic situation of the road is 'delay,' it is '20,' and if the traffic situation of the road is 'jam,' it is '30.'

TABLE 1

| Overtaking condition | Traffic flow following tendency |
|---|---|
| Overtaken vehicles − overtaking vehicles > threshold value | Preceding |
| Overtaken vehicles − overtaking vehicles ≤ threshold value | Following |
| Overtaking vehicles − overtaken vehicles > threshold value | Trailing |

Referring to Table 1, if the overtaken vehicles are greater than the overtaking vehicles by the threshold value or more, the vehicle precedes the nearby vehicles in many cases, such that the driver's traffic flow following tendency becomes 'preceding.' In the opposite case, the nearby vehicles precede the vehicle in many cases, such that the driver's traffic flow following tendency becomes 'trailing.' By the way, if a difference value of the overtaking vehicles or the overtaken vehicles is smaller than the threshold value, the overtaking vehicles or the overtaken vehicles are similar, such that the driver's traffic flow following tendency becomes 'following.'

In addition, the driving tendency determination unit 40 determines the driver's speed tendency using speed information provided from the speed information provision unit 50 and traffic information provided from the traffic information provision unit 60.

Herein, the traffic information indicates traffic situation (i.e., smoothness, delay, and jam) of the road on which the vehicle is driving. That is, if the traffic situation of the road is 'smoothness,' the driving speed of the vehicle indicates the reference speed range that is 70 km/h or more; if the traffic situation of the road is 'delay,' the driving speed of the vehicle indicates the reference speed range that is 40 km/h or more; and if the traffic situation of the road is 'jam,' the driving speed of the vehicle indicates the reference speed range that is less than 40 km/h.

Specifically, the driving tendency determination unit 40 determines the driver's speed tendency by presetting a vehicle speed section based on the traffic information provided from the traffic information provision unit 60 and then confirming the section to which the speed information provided from the speed information provision unit 50 with respect to the vehicle speed section that is set belongs.

Herein, the driving tendency determination unit 40 can set the vehicle speed section depending upon each traffic situation of the traffic information like Table 2 below. Table 2 below indicates the vehicle speed section for each traffic situation.

TABLE 2

| Traffic situation | Vehicle speed section | Speed tendency |
| --- | --- | --- |
| Smoothness | Speed information ≥ 90 km/h | Fast |
| (70 km/h or more) | 90 km/h > speed information ≥ 70 km/h | Normal |
|  | Speed information < 70 km/h | Slow |
| Delay | Speed information ≥ 70 km/h | Fast |
| (40 km/h or more) | 70 km/h > speed information ≥ 40 km/h | Normal |
|  | Speed information < 40 km/h | Slow |
| Jam | Speed information ≥ 40 km/h | Fast |
| (less than 40 km/h) | Speed information < 40 km/h | Normal or slow |

Referring to Table 2, if the traffic situation is 'smoothness,' the driving speed is 70 km/h or more; and when the speed information is 90 km/h or more, the speed tendency is determined as 'fast,' when the speed information is less than 90 km/h and 70 km/h or more, the speed tendency is determined as 'normal,' and when the speed information is less than 70 km/h, the speed tendency is determined as 'slow.'

If the traffic situation is 'delay,' the driving reference speed is 40 km/h or more; and when the speed information is 70 km/h or more, the speed tendency is determined as 'fast,' when the speed information is less than 70 km/h and 40 km/h or more, the speed tendency is determined as 'normal,' and when the speed information is less than 40 km/h, the speed tendency is determined as 'slow.'

In addition, if the traffic situation is 'jam,' the driving reference speed is less than 40 km/h; and when the speed information is 40 km/h or more, the speed tendency is determined as 'fast,' and when the speed information is less than 40 km/h, the speed tendency is determined as 'normal,' or 'slow' depending upon the overtaking condition.

Based on the foregoing, the driving tendency determination unit 40 can determine the driver's traffic flow following tendency and speed tendency by integrally applying the above-described overtaking condition and the vehicle speed section depending upon each traffic situation. That is, the driving tendency determination unit 40 determines the driver's traffic flow following tendency and speed tendency by integrally applying the overtaking condition per vehicle speed section depending upon each traffic situation to prepare determination reference with respect to the driver's traffic flow following tendency and speed tendency.

Figure 3A:
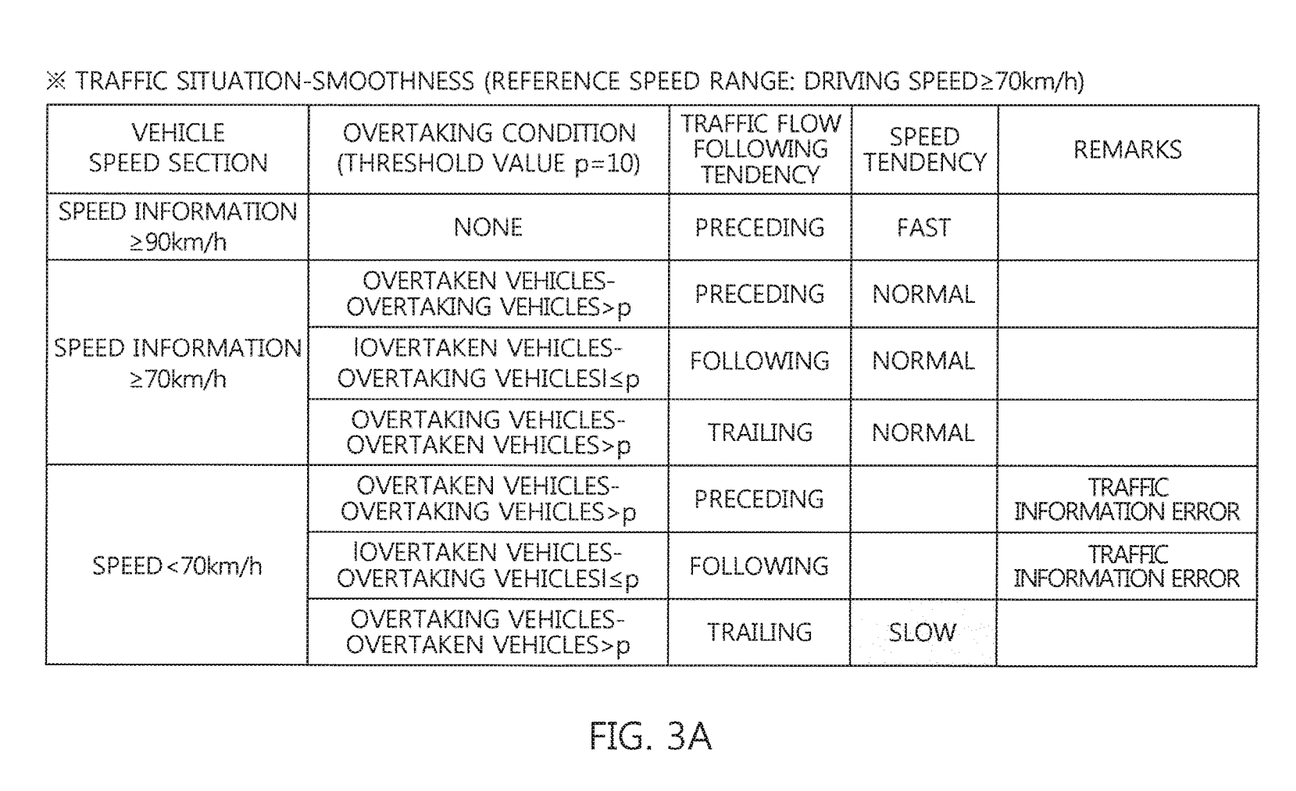
FIGS. 3A to 3C are diagrams explaining driver's following tendency determination reference.
Figure 3B:
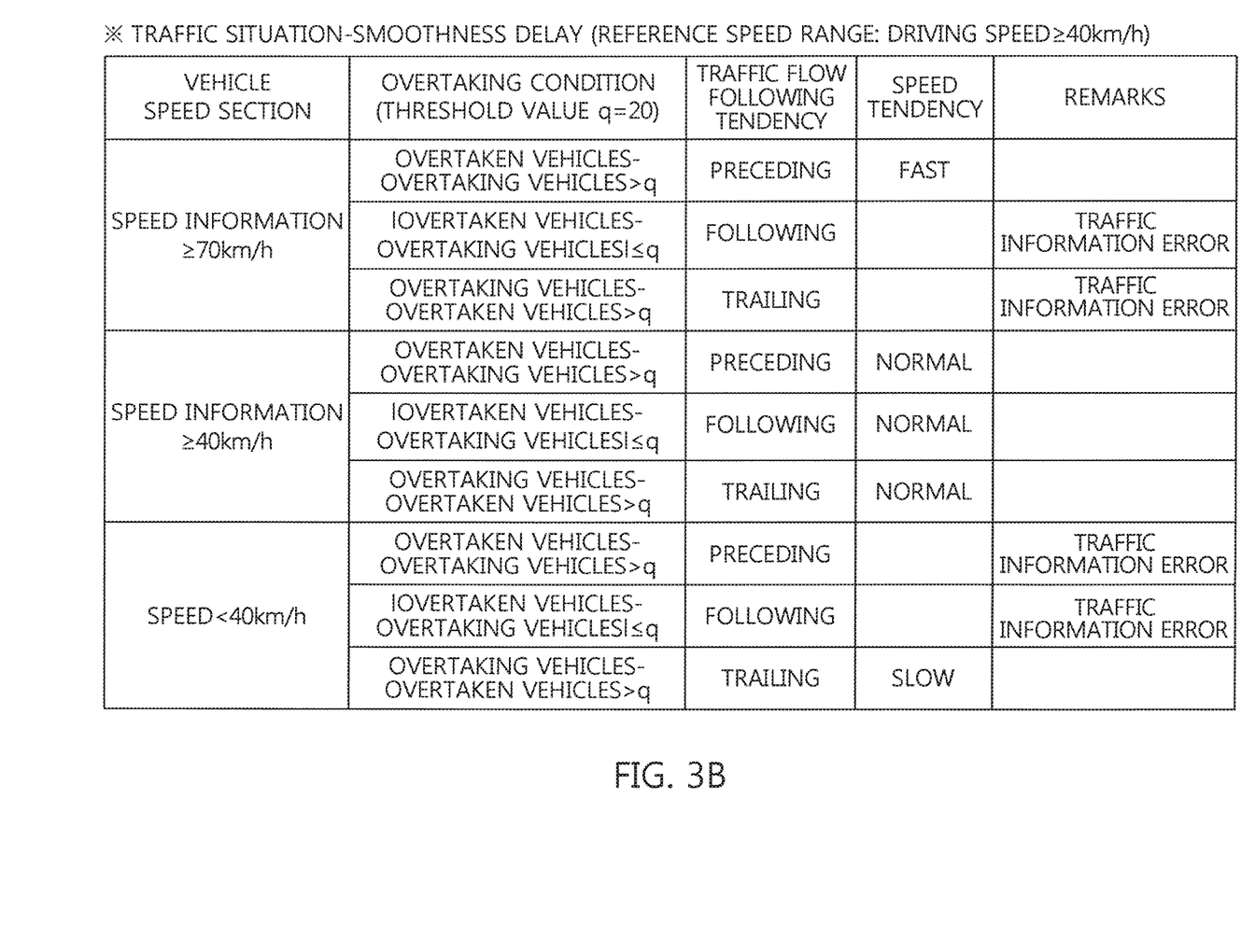
Figure 3C:
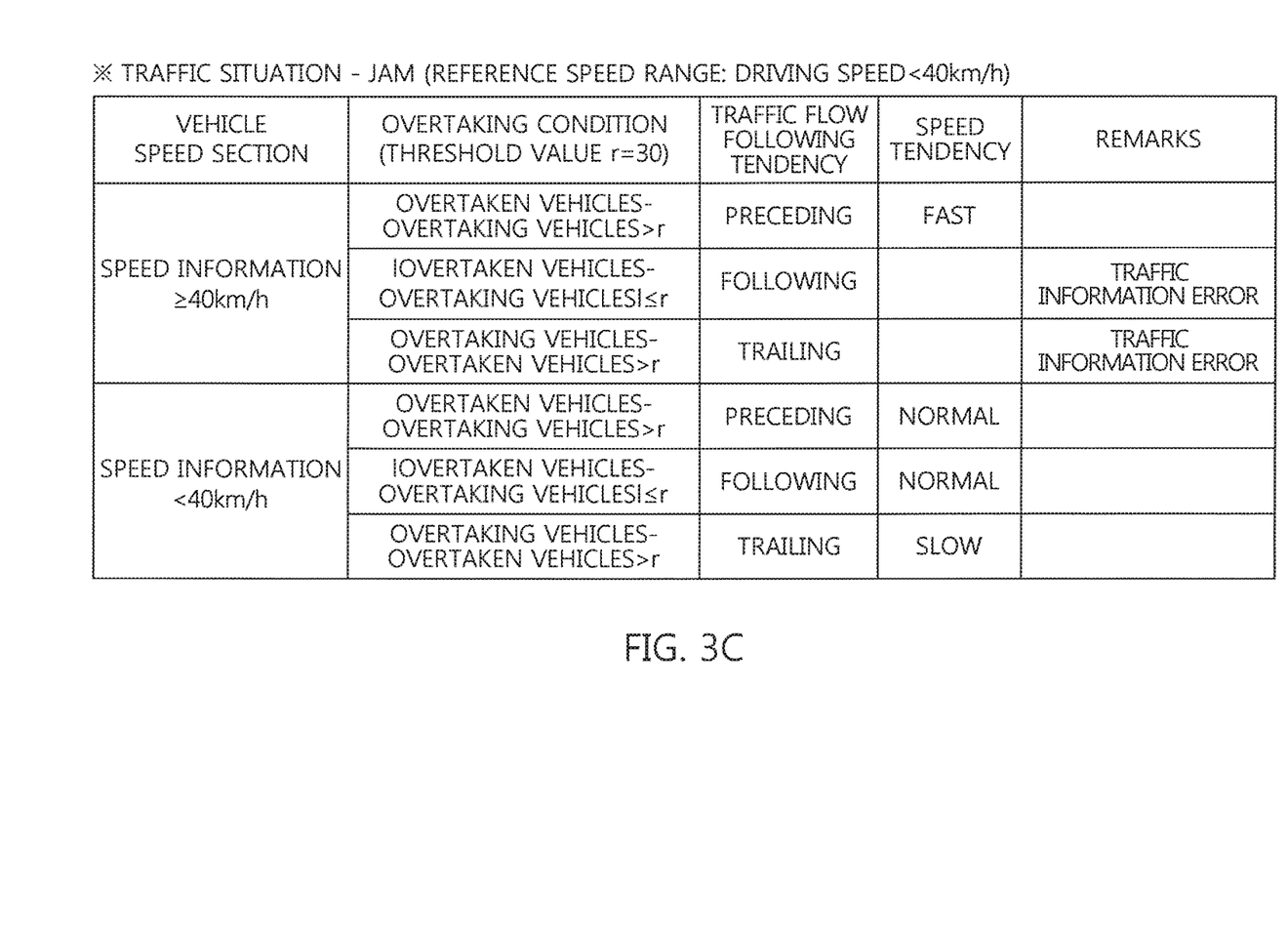

Specifically, the driving tendency determination unit 40 can determine the driver's driving tendency with reference to FIGS. 3A to 3C. FIGS. 3A to 3C are diagrams explaining driver's following tendency determination reference.

FIG. 3A illustrates the determination reference with respect to the driver's traffic flow following tendency and speed tendency when the traffic situation is 'smoothness (a reference speed range: a driving speed ≥70 km/h).'

Firstly, if the speed information of the vehicle belongs to the vehicle speed section faster than the reference speed range of the traffic situation (i.e., speed information ≥90 km/h), the driving tendency determination unit 40 determines the traffic flow following tendency as 'preceding' and the speed tendency as 'fast' without considering the overtaking condition.

Next, if the speed information of the vehicle belongs to the vehicle speed section corresponding to the reference speed range of the traffic situation (i.e., speed information ≥70 km/h), the driving tendency determination unit 40 determines the traffic flow following tendency as 'preceding,' 'following,' and 'trailing' depending upon the overtaking condition and the speed tendency as 'normal.'

Lastly, if the speed information of the vehicle belongs to the vehicle speed section slower than the reference speed range of the traffic situation (i.e., speed information <70 km/h), the driving tendency determination unit 40 determines the traffic flow following tendency as 'preceding,' 'following,' and 'trailing' depending upon the overtaking condition and the speed tendency as 'slow.'

By the way, in this case, the case that the speed information of the vehicle is slower than the reference speed range of the traffic situation 'smoothness' (i.e., 70 km/h or more) and the traffic flow following tendency is 'preceding' or 'following' is included therein. In this time, the traffic information error sensing unit 70 senses it as a traffic information error. This is because the vehicle is driving faster than or follows the traffic flow, but if it is difficult to satisfy the reference speed range of the traffic situation 'smoothness' (i.e., 70 km/h or more), the traffic situation is not 'smoothness' but can be 'jam.'

Accordingly, in this case, it is recognized as a valid driver's driving tendency only if the driving tendency determination unit 40 determines the traffic flow following tendency as 'trailing' and the speed tendency as 'slow.'

FIG. 3B illustrates the determination reference with respect to the driver's traffic flow following tendency and speed tendency when the traffic situation is 'delay (a reference speed range: a driving speed ≥40 km/h).'

Firstly, if the speed information of the vehicle belongs to the vehicle speed section faster than the reference speed range of the traffic situation (i.e., speed information ≥70 km/h), the driving tendency determination unit 40 determines the traffic flow following tendency as 'preceding,' 'following,' and 'trailing' depending upon the overtaking condition and the speed tendency as 'fast' as in FIG. 3B.

By the way, in this case, the case that the speed information of the vehicle is faster than the reference speed range of the traffic situation 'delay' (i.e., 40 km/h or more) and the traffic flow following tendency is 'following' or 'trailing' is included therein. In this time, the traffic information error sensing unit 70 senses it as a traffic information error. This is because the vehicle follows the traffic flow or is driving slower than it, but if it is driving faster than the reference speed range of the traffic situation 'smoothness' (i.e., 70 km/h or more), the traffic situation is not 'delay' but can be 'smoothness.'

Accordingly, in this case, it is recognized as a valid driver's driving tendency only if the driving tendency determination unit 40 determines the traffic flow following tendency as 'preceding' and the speed tendency as 'fast.'

Herein, the driving tendency determination unit 40 can determine the traffic flow following tendency as 'preceding' and the speed tendency as 'fast' without considering the overtaking condition as in FIG. 3A, but since there is the case that the traffic situation is not 'delay' but 'smoothness,' it is preferable to determine the traffic flow following tendency depending upon the overtaking condition in order to confirm the traffic information error.

Next, if the speed information of the vehicle belongs to the vehicle speed section corresponding to the reference speed range of the traffic situation (i.e., speed information ≥40 km/h), the driving tendency determination unit 40 determines the traffic flow following tendency as 'preceding,' 'following,' and 'trailing' depending upon the overtaking condition and the speed tendency as 'normal.'

Lastly, if the speed information of the vehicle belongs to the vehicle speed section slower than the reference speed range of the traffic situation (i.e., speed information <40 km/h), the driving tendency determination unit 40 determines the traffic flow following tendency as 'preceding,' 'following,' and 'trailing' depending upon the overtaking condition and the speed tendency as 'slow.'

By the way, in this case, the case that the speed information of the vehicle is not over the reference speed range of the traffic situation 'delay' (i.e., 40 km/h or more) and the traffic flow following tendency is 'preceding' or 'following' is included therein. In this time, the traffic information error sensing unit 70 senses it as a traffic information error. This is because the vehicle is driving faster than the traffic flow or follows it, but if it is difficult to satisfy the reference speed range of the traffic situation 'delay' (i.e., 40 km/h or more), the traffic situation is not 'delay' but can be 'jam.'

Accordingly, in this case, it is recognized as a valid driver's driving tendency only if the driving tendency determination unit 40 determines the traffic flow following tendency as 'trailing' and the speed tendency as 'slow.'

FIG. 3C illustrates the determination reference with respect to the driver's traffic flow following tendency and speed tendency when the traffic situation is 'jam (a reference speed range: a driving speed <40 km/h).'

Firstly, if the speed information of the vehicle belongs to the vehicle speed section faster than the reference speed range of the traffic situation (i.e., speed information ≥40 km/h), the driving tendency determination unit 40 can determine the traffic flow following tendency as 'preceding,' 'following,' and 'trailing' depending upon the overtaking condition and the speed tendency as 'fast.'

By the way, in this case, the case that the speed information of the vehicle is faster than the reference speed range of the traffic situation 'jam' (i.e., less than 40 km/h) and the traffic flow following tendency is 'following' or 'trailing' is included therein. In this time, the traffic information error sensing unit 70 senses it as a traffic information error. This is because the vehicle follows the traffic flow or is driving slower than it, but if it is driving faster than the reference speed range of the traffic situation 'delay' (i.e., 40 km/h or more), the traffic situation is not 'jam' but can be 'delay.'

Accordingly, in this case, it is recognized as a valid driver's driving tendency only if the driving tendency determination unit 40 determines the traffic flow following tendency as 'preceding' and the speed tendency as 'fast.'

Next, if the speed information of the vehicle belongs to the vehicle speed section corresponding to the reference speed range of the traffic situation (i.e., speed information <40 km/h), the driving tendency determination unit 40 determines the traffic flow following tendency as 'preceding,' 'following,' and 'trailing' depending upon the overtaking condition and the speed tendency as 'normal.'

Meanwhile, the speed information provision unit 50 provides the speed information of the vehicle (i.e., the vehicle speed) to the driving tendency determination unit 40. In this time, the speed information provision unit 50 can confirm the speed information through an Engine Control Unit (ECU). Additionally, the speed information provision unit 50 can confirm the state information of an acceleration pedal and the state information of a brake pedal through the ECU.

In addition, the traffic information provision unit 60 provides the traffic information from a traffic information server (not shown), which is externally located, to the driving tendency determination unit 40.

The traffic information error sensing unit 70, as described above, senses the traffic information error based on the determined results with respect to the driver's traffic flow following tendency depending upon the overtaking condition by the driving tendency determination unit 40.

Specifically, the traffic information error sensing unit 70 senses the traffic information error when the driver's traffic flow following tendency is 'following' or 'trailing' in the case that the vehicle speed is faster than the reference speed range of the traffic situation. In this case, the traffic information error sensing unit 70 senses the traffic information error when the traffic flow following tendency is 'following' or 'trailing' in the case that the speed information of the vehicle belongs to the vehicle speed section faster than the reference speed range of the traffic situation (i.e., the vehicle speed section that is 'speed information ≥70 km/h' in FIG. 3B).

In addition, the traffic information error sensing unit 70 senses the traffic information error when the driver's traffic flow following tendency is 'preceding' or 'following' in the case that the vehicle speed is slower than the reference speed range of the traffic situation. In this case, the traffic information error sensing unit 70 senses the traffic information error when the traffic flow following tendency is 'preceding' or 'following' in the case that the speed information of the vehicle belongs to the vehicle speed section slower than the reference speed range of the traffic situation (i.e., the vehicle speed section that is 'speed information <70 km/h' in FIG. 3A and the vehicle speed section that is 'speed information <70 km/h' in FIG. 3B).

Meanwhile, the driving tendency determination apparatus 100 can include a database (not shown) for storing the determined results of the driver's driving tendency as well as the past driving information (i.e., a driving route, a driving speed, a driving time, etc.) of the vehicle.

Figure 4:
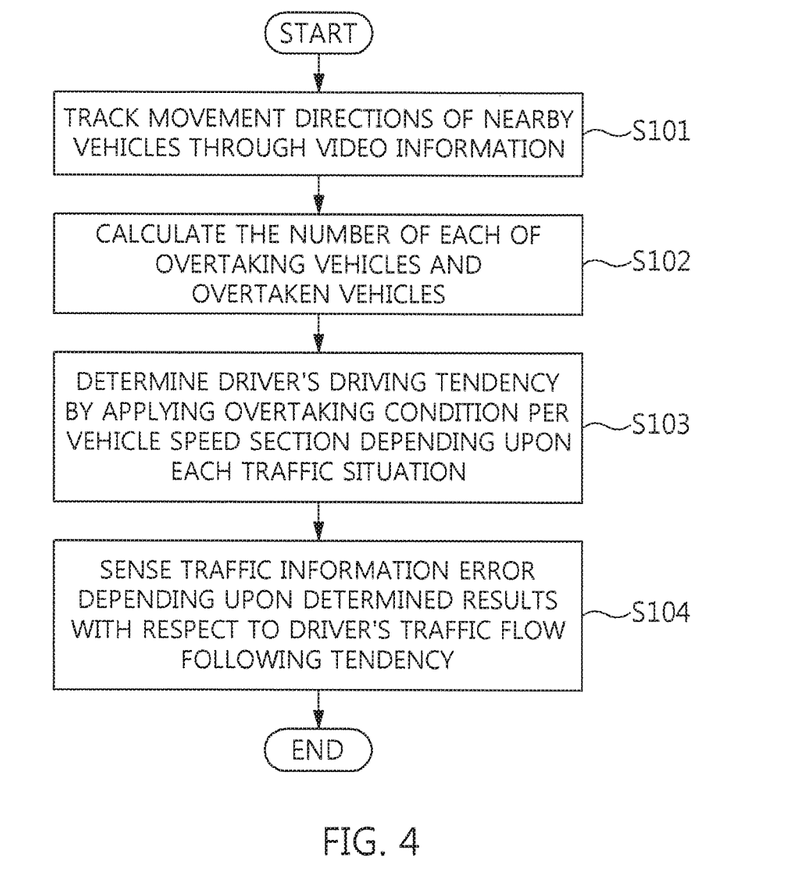
FIG. 4 is a diagram illustrating a method of determining driver's driving tendency in accordance with an embodiment of the present disclosure.

FIG. 4 is a diagram illustrating a method of determining the driver's driving tendency in accordance with an embodiment of the present disclosure.

The driving tendency determination apparatus 100 senses the nearby vehicles in real time from the video information to track the movement directions of nearby vehicles S101. In this time, the driving tendency determination apparatus 100 calculates the number of each of the overtaking vehicles and the overtaken vehicles S102.

Then, the driving tendency determination apparatus 100 determines the driver's driving tendency by applying an overtaking condition per vehicle speed section depending upon each traffic situation S103. That is, the driving tendency determination apparatus 100 determines the driver's driving tendency depending upon the vehicle speed section and the overtaking condition depending upon each traffic situation.

In this time, the driving tendency determination apparatus 100 determines the driver's driving tendency, i.e., the traffic flow following tendency and speed tendency by distinguishing the case that the traffic situation is smoothness, the case that the traffic situation is delay, and the case that the traffic situation is jam, respectively. For example, assuming that the traffic situation from the received traffic information is confirmed to be 'jam' state (a threshold value 30), the vehicle speed is 55 km/h, the number of the overtaking vehicles for five minutes is 100, and the number of the overtaken vehicles is 550, the following will be described. In this time, referring to FIG. 3C, the driving tendency determination apparatus 100 determines the driver's traffic flow following tendency as 'preceding' and the driver's speed tendency as 'fast' by confirming the difference value of the overtaken vehicles and the overtaking vehicles depending upon the overtaking condition as 450.

Meanwhile, the driving tendency determination apparatus 100 can sense the traffic information error based on the determined results with respect to the driver's traffic flow following tendency S104. For example, it was confirmed that the traffic situation from the received traffic information is 'smoothness,' the vehicle speed is 60 km/h, and the difference value of the overtaken vehicles and the overtaking vehicles is 100. In this time, the driving tendency determination apparatus 100 determines the driver's traffic flow following tendency as 'preceding,' but since it is difficult for the vehicle speed to satisfy the reference speed range of 'smoothness' (a driving speed ≥70 km/h), it senses the traffic information error.

A method in accordance with some embodiments can be implemented in the form of program instructions that can be executed through various computer means and recorded on a computer readable medium. The computer readable medium can include program instructions, data files, data structure, etc. alone or in combination thereof. The program instructions recorded on the medium can be those specially designed and constructed for the present disclosure or can be available to those skilled in the art of computer software. Examples of computer readable media include magnetic media such as hard disks, floppy disks and magnetic tape, optical media such as CDROM, DVD, magneto-optical media such as floptical disks, and hardware apparatus specifically configured to store and execute program instructions such as ROM, RAM, and flash memory. Examples of program instructions include machine language code such as those generated by a computer, as well as high-level language code that can be executed by a computer using an interpreter, etc.

Although the present disclosure has been described with a focus on novel features of the present disclosure applied to various embodiments, it will be apparent to those skilled in the art that various deletions, substitutions, and changes in the form and details of the apparatus and method described above may be made without departing from the scope of the present disclosure. Accordingly, the scope of the present disclosure is defined by the appended claims rather than by the foregoing description. All modifications within the equivalent scope of the appended claims are embraced within the scope of the present disclosure.

What is claimed is:

1. A driver's driving tendency determination apparatus for a vehicle, comprising:
   an image sensor for obtaining video information of nearby driving scenes;
   a speed sensor for obtaining speed information of the vehicle;
   a navigation system for obtaining traffic information of a road on which the vehicle travels; and
   a controller configured to:
   calculate a number of overtaking vehicles and a number of overtaken vehicles by tracking movement directions of nearby vehicles through the video information of the nearby driving scenes;
   compare a difference value of the calculated number of the overtaking vehicles and the calculated number of overtaken vehicles with a threshold value;
   determine a driver's speed tendency using the traffic information indicating the speed information of the vehicle and a traffic situation of the road on which the vehicle travels; and
   determine a driver's traffic flow following tendency by comparing the calculated difference value of the overtaking and overtaken vehicles with a predetermined condition.

2. The driver's driving tendency determination apparatus of claim 1, wherein the speed information of the vehicle is compared with a reference speed range of the traffic situation of the road.

3. The driver's driving tendency determination apparatus of claim 2, wherein the controller determines the driver's traffic flow following tendency and the driver's speed tendency by integrating the predetermined condition per vehicle speed section depending upon the traffic situation.

4. The driver's driving tendency determination apparatus of claim 1, wherein the controller is further configured to determine a traffic information error based on the driver's traffic flow following tendency depending upon the predetermined condition.

5. The driver's driving tendency determination apparatus of claim 1, wherein the threshold value is set depending upon the traffic situation that is smoothness, delay or jam.

6. The driver's driving tendency determination apparatus of claim 5, wherein the threshold value is variously set depending upon the traffic situation.

7. The driver's driving tendency determination apparatus of claim 5, wherein the driver's traffic flow following tendency is determined as preceding when the calculated number of the overtaken vehicles is greater than the calculated number of the overtaking vehicles by the threshold value or more,
   the driver's traffic flow following tendency is determined as trailing when the calculated number of the overtaking vehicles is greater than the calculated number of the overtaken vehicles by the threshold value or more, and the driver's traffic flow following tendency is determined as following when a different value of the calculated number of the overtaken vehicles and the calculated number of overtaking vehicles is smaller than the threshold value.

8. The driver's driving tendency determination apparatus of claim 7, wherein the controller determines the traffic information error when the driver's traffic flow following tendency is following or trailing in a case that the vehicle speed is greater than a reference speed range of the traffic situation.

9. The driver's driving tendency determination apparatus of claim 7, wherein the controller determines the traffic information error when the driver's traffic flow following tendency is preceding or following in a case that the vehicle speed is smaller than a reference speed range of the traffic situation.

10. A method of determining driver's driving tendency, comprising steps of:
   calculating, by a controller, a number of overtaking vehicles and a number of overtaken vehicles by tracking movement directions of nearby vehicles through video information of nearby driving scenes, speed information of a vehicle and traffic information of a road on which the vehicle travels;
   comparing a difference value of the calculated number of overtaking vehicles and the calculated number of overtaken vehicles with a threshold value;
   determining a driver's speed tendency using the traffic information indicating the speed information of the vehicle and a traffic situation of the road on which the vehicle travels; and
   determining, by the controller, a driver's traffic flow following tendency by comparing the calculated difference value of the overtaking and overtaken vehicles with a predetermined condition.

11. The method of claim 10, wherein the step of determining comprises comparing the speed information of the vehicle with a reference speed range of the traffic situation of the road on which the vehicle travels.

12. The method of claim 11, wherein the step of determining determines the driver's traffic flow following tendency and the driver's speed tendency by integrating the predetermined condition per vehicle speed section depending upon each traffic situation.

13. The method of claim 10, further comprising, after the step of determining: determining a traffic information error based on the determined driver's traffic flow following tendency depending upon the predetermined condition.

* * * * *